United States Patent
You

(10) Patent No.: US 9,778,524 B2
(45) Date of Patent: Oct. 3, 2017

(54) LIQUID CRYSTAL DISPLAY, LIQUID CRYSTAL PANEL, AND METHOD OF DRIVING THE SAME

(75) Inventor: Bong-Hyun You, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 1562 days.

(21) Appl. No.: 11/566,414

(22) Filed: Dec. 4, 2006

(65) Prior Publication Data
US 2007/0139331 A1 Jun. 21, 2007

(30) Foreign Application Priority Data
Dec. 6, 2005 (KR) .................. 10-2005-0117982

(51) Int. Cl.
G09G 3/36 (2006.01)
G02F 1/1362 (2006.01)

(52) U.S. Cl.
CPC ....... *G02F 1/13624* (2013.01); *G09G 3/3659* (2013.01); *G09G 3/3677* (2013.01); *G09G 2300/0823* (2013.01); *G09G 2310/0251* (2013.01); *G09G 2320/0261* (2013.01)

(58) Field of Classification Search
CPC ...... G09G 3/36; G09G 3/3648; G09G 3/3655; G09G 3/3659; G09G 3/3611; G09G 3/3625; G09G 3/364; G09G 3/3644; G09G 3/3666; G09G 3/3677
USPC .................................................. 345/87–104
See application file for complete search history.

(56) References Cited

U.S. PATENT DOCUMENTS

| | | | | |
|---|---|---|---|---|
| 6,069,600 A * | 5/2000 | Saishu et al. | .................. | 345/87 |
| 6,181,311 B1 * | 1/2001 | Hashimoto | ..................... | 345/98 |
| 6,181,331 B1 * | 1/2001 | Trainor et al. | ................ | 345/212 |
| 7,483,022 B2 * | 1/2009 | Edwards | ....................... | 345/208 |
| 8,009,133 B2 * | 8/2011 | You | ...................... | G09G 3/3659 345/90 |
| 2003/0011556 A1 * | 1/2003 | Morita | ........................... | 345/98 |
| 2003/0184510 A1 * | 10/2003 | Chen | ............................... | 345/92 |
| 2003/0189535 A1 * | 10/2003 | Matsumoto et al. | ........... | 345/76 |
| 2003/0206149 A1 * | 11/2003 | Yamashita et al. | ............ | 345/92 |
| 2004/0008172 A1 * | 1/2004 | Nakamura et al. | ............ | 345/89 |
| 2004/0041759 A1 * | 3/2004 | Kobayashi et al. | ............ | 345/87 |
| 2004/0080480 A1 * | 4/2004 | Zhang et al. | ................... | 345/90 |
| 2005/0156862 A1 * | 7/2005 | Hirayama et al. | ............ | 345/100 |

(Continued)

FOREIGN PATENT DOCUMENTS

JP 09-288261 4/1997

*Primary Examiner* — Alexander Eisen
*Assistant Examiner* — Nelson Lam
(74) *Attorney, Agent, or Firm* — F. Chau & Associates, LLC

(57) ABSTRACT

A liquid crystal display includes a plurality of data lines and a plurality of gate lines disposed on a substrate in horizontal and vertical directions, respectively, pixel electrodes formed at intersecting regions of the data lines and the gate lines, a plurality of erasing signal lines disposed parallel to the gate lines, first thin film transistors, each including a first source electrode connected to one data line, a first gate electrode connected to one gate line, and a first drain electrode connected to one pixel electrode, and second thin film transistors, each including a second drain electrode connected to the pixel electrode, a second gate electrode connected to the erasing signal line, and a second source electrode connected to a predetermined potential.

8 Claims, 6 Drawing Sheets

(56) References Cited

U.S. PATENT DOCUMENTS

| | | | |
|---|---|---|---|
| 2005/0275614 A1* | 12/2005 | Kim et al. | 345/100 |
| 2006/0077167 A1* | 4/2006 | Kim et al. | 345/98 |
| 2007/0035495 A1* | 2/2007 | Chang | 345/87 |
| 2008/0136983 A1* | 6/2008 | Huang | 349/38 |
| 2009/0128472 A1* | 5/2009 | Chen | G09G 3/3659 345/88 |
| 2010/0220116 A1* | 9/2010 | Liao et al. | 345/690 |

\* cited by examiner

LIQUID CRYSTAL DISPLAY, LIQUID CRYSTAL PANEL, AND METHOD OF DRIVING THE SAME

CROSS-REFERENCE TO RELATED APPLICATION

This application claims priority to and the benefit of Korean Patent Application No. 10-2005-0117982 filed in the Korean Intellectual Property Office on Dec. 6, 2005, the disclosure of which is incorporated by reference in its entirety.

BACKGROUND OF THE INVENTION (a) Technical Field

The present disclosure relates to a liquid crystal display, a liquid crystal panel, and a method of driving the same.

(b) Description of the Related Art

A liquid crystal display (LCD) is a commonly used flat panel display. The LCD includes two display panels provided with field generating electrodes, such as, pixel electrodes and a common electrode, and a liquid crystal layer interposed between the two display panels. Furthermore, the LCD displays desired images by applying voltages to the field generating electrodes to generate an electric field in the liquid crystal layer and adjusting transmittance of light that passes through the liquid crystal layer by controlling intensity of the electric field.

When the unidirectional electric field is applied to the liquid crystal layer for a long time, degradation of the liquid crystal layer occurs. In order to prevent the degradation phenomenon, it is required to reverse the polarity of data voltages relative to the common voltage every frame, every column, or every pixel.

Since LCD is not self-emissive, the LCD can display images by controlling the transmittance of light generated from a separate light source. Therefore, the luminance of the LCD degrades as compared with a self-emissive display device, such as, a cathode ray tube (CRT) or a plasma display panel (PDP).

Thus, the LCD employs a driving method that sequentially charges the pixels only for one horizontal synchronization period (that equals to several tens of microseconds) among one frame period (that equals to several to several tens of milliseconds and is required to displaying an image) and stores the charged electric charge for the reminder of the frame period.

However, the above-described driving characteristic of the LCD may yield an afterimage where the image of the previous frame remains in the next frame period in the user's eye, because the voltages of the previous frame charged in the pixels remains until the next frame.

Particularly, in the case of display a moving picture, the display characteristics of the LCD may exhibit a ghost phenomenon leaving a trace of moving objects in an opposite direction of a movement direction of the moving objects or a blurring phenomenon where the outlines of objects is blurred. Therefore, the display quality of a TV set or the like using a liquid crystal panel may be deteriorated.

SUMMARY OF THE INVENTION

Embodiments of the present invention provide a liquid crystal display capable of increasing a response speed, a method of driving the above-mentioned liquid crystal display.

According to an exemplary embodiment of the present invention, a liquid crystal display includes: a plurality of data lines and a plurality of gate lines disposed on a transparent substrate in horizontal and vertical directions, respectively; pixel electrodes formed at intersecting regions of the data lines and the gate lines; a plurality of erasing signal lines disposed parallel to the gate lines to transmit erasing signals; first thin film transistors, each including a first source electrode connected to one data line, a first gate electrode connected to one gate line, and a first drain electrode connected to one pixel electrode; and second thin film transistors, each including a second drain electrode connected to the pixel electrode, a second gate electrode connected to the erasing signal line, and a second source electrode connected to a predetermined potential.

The liquid crystal display may further include storage electrode lines formed on the transparent substrate, and the second source electrodes may be connected to the storage electrode lines.

When n and k are natural numbers smaller than m where m is the number of gate lines, the erasing signal applied to the k-th erasing signal line may be identical to a gate signal applied to the (k−n)-th (k>n) gate line or a gate signal applied to the (k−n+m)-th (k≤n) gate line.

The k-th erasing signal line may be connected to either the (k−n)-th (in the case of k>n) gate line or the (k−n+m)-th (in the case of k≤n) gate line.

The erasing signal lines and the gate lines may be formed on the same layer.

The liquid crystal display may further include: connection lines formed on the same layer as the data lines; first connection pads connecting the erasing signal lines and the connection lines; and second connection pads connecting the gate lines and the connection lines. The first connection pads and the second connection pads may be formed on the same layer as the pixel electrodes.

The connection lines, the first connection pads, and the second connection pads may be formed at a peripheral are in which the pixel electrodes are not formed.

The second source electrode may be connected to the gate line in the immediately previous stage.

The liquid crystal display may be a normally black mode.

The liquid crystal display may be a vertical alignment (VA) mode.

According to an exemplary embodiment of the present invention, a method of driving a display device includes discharging the data voltage charged in the capacitor by applying erasing potential. The display device includes a plurality of data lines; a plurality of writing signal lines; a plurality of erasing signal lines; a plurality of capacitors; a plurality of first switching elements each including an input terminal connected to one data line, an output terminal connected to one end of one capacitor, and a control terminal connected to one writing signal line; a plurality of second switching elements each including an input terminal connected to an erasing potential terminal having a predetermined potential, an output terminal connected to one end of the capacitor, and a control terminal to one erasing signal line; and a common potential terminal connected to the other end of each of the capacitors. The method includes: charging data voltage in the capacitor by applying writing signal to the writing signal lines, the data voltage being transmitted by the data line.

The erasing potential may be substantially equal to the common potential.

The writing signals may be applied by a time interval accord to a dispose sequence of the writing signal lines, and the erasing signal of one of the erasing signal lines may be synchronized with the writing signal of one of the writing signal lines.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EXEMPLARY EMBODIMENTS

The invention is described more fully hereinafter with reference to the accompanying drawings, in which exemplary embodiments of the invention are shown.
The invention may, however, be embodied in many different forms and should not be construed as limited to the exemplary embodiments set forth herein.

Figure 1:
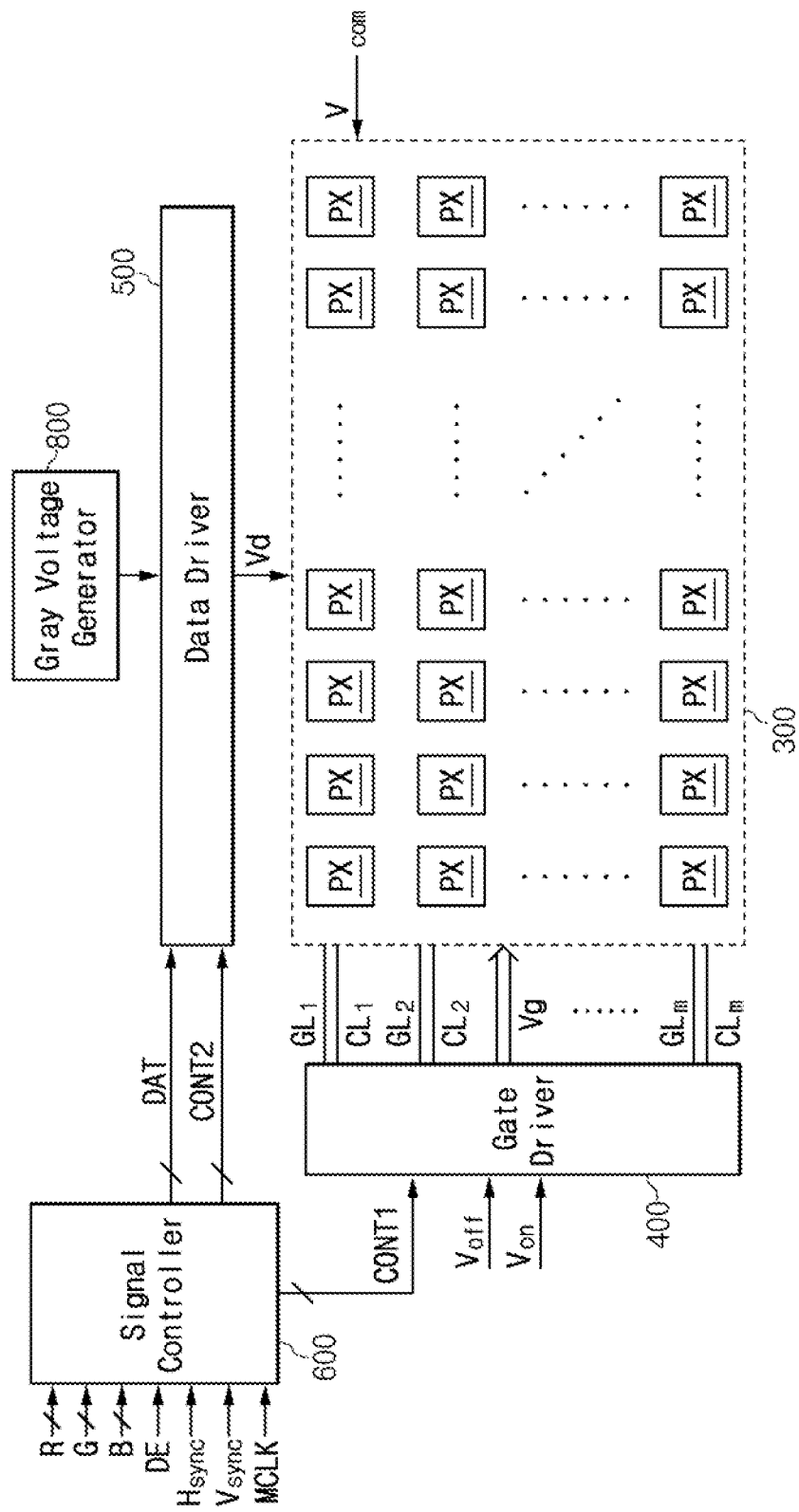
FIG. 1 is a block diagram of a liquid crystal display according to exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

The liquid crystal panel assembly 300 includes a plurality of pixels PX arranged substantially in a matrix.

Figure 2:
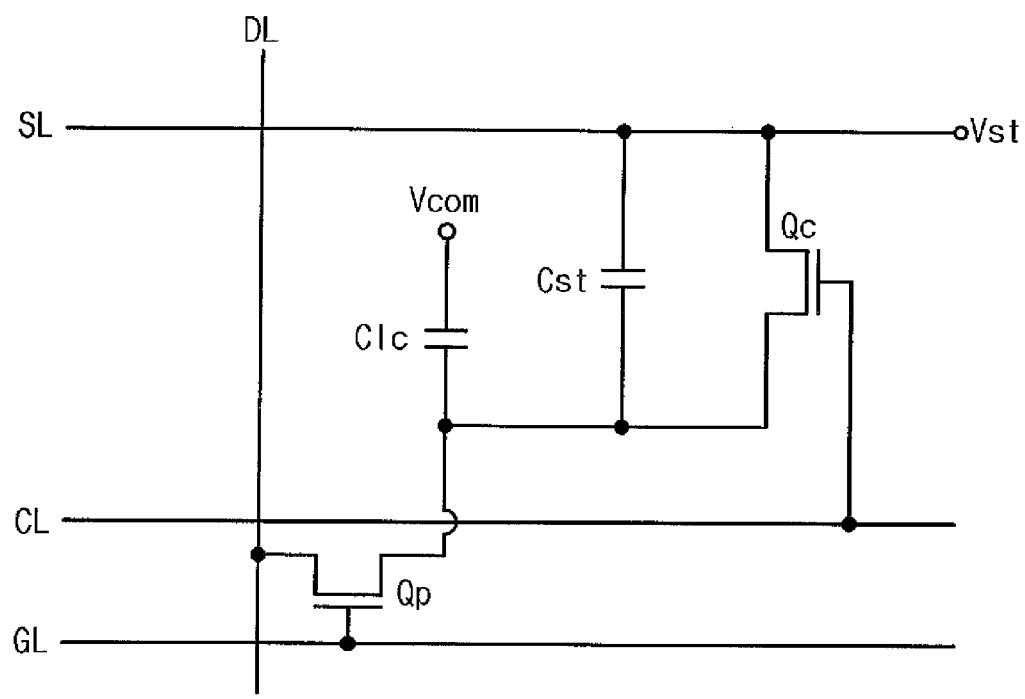
FIG. 2 is an equivalent circuit diagram showing a pixel of a liquid crystal display according to an exemplary embodiment of the present invention.

Referring to FIG. 2, the panel assembly 300 further includes a plurality of signal lines GL, DL, SL, and CL coupled to the pixels PX.

Meanwhile, the liquid crystal panel assembly 300 includes a lower panel (not shown) and an upper panel (not shown) facing each other and a liquid crystal layer 3 interposed between the lower panel and the upper panel.

The signal lines include a plurality of gate lines (not shown) to transmit gate signals (referred to as "scanning signals") and a plurality of data lines (not shown) to transmit data signals.

The gate lines extend substantially in a row direction to be parallel to each other, and the data lines extend substantially in a column direction to be parallel to each other.

Each pixel PX includes a liquid crystal capacitor Clc and a switching element (not shown) connected to one of the gate lines, one of the data lines, and the liquid crystal capacitor Clc.

Figure 4:
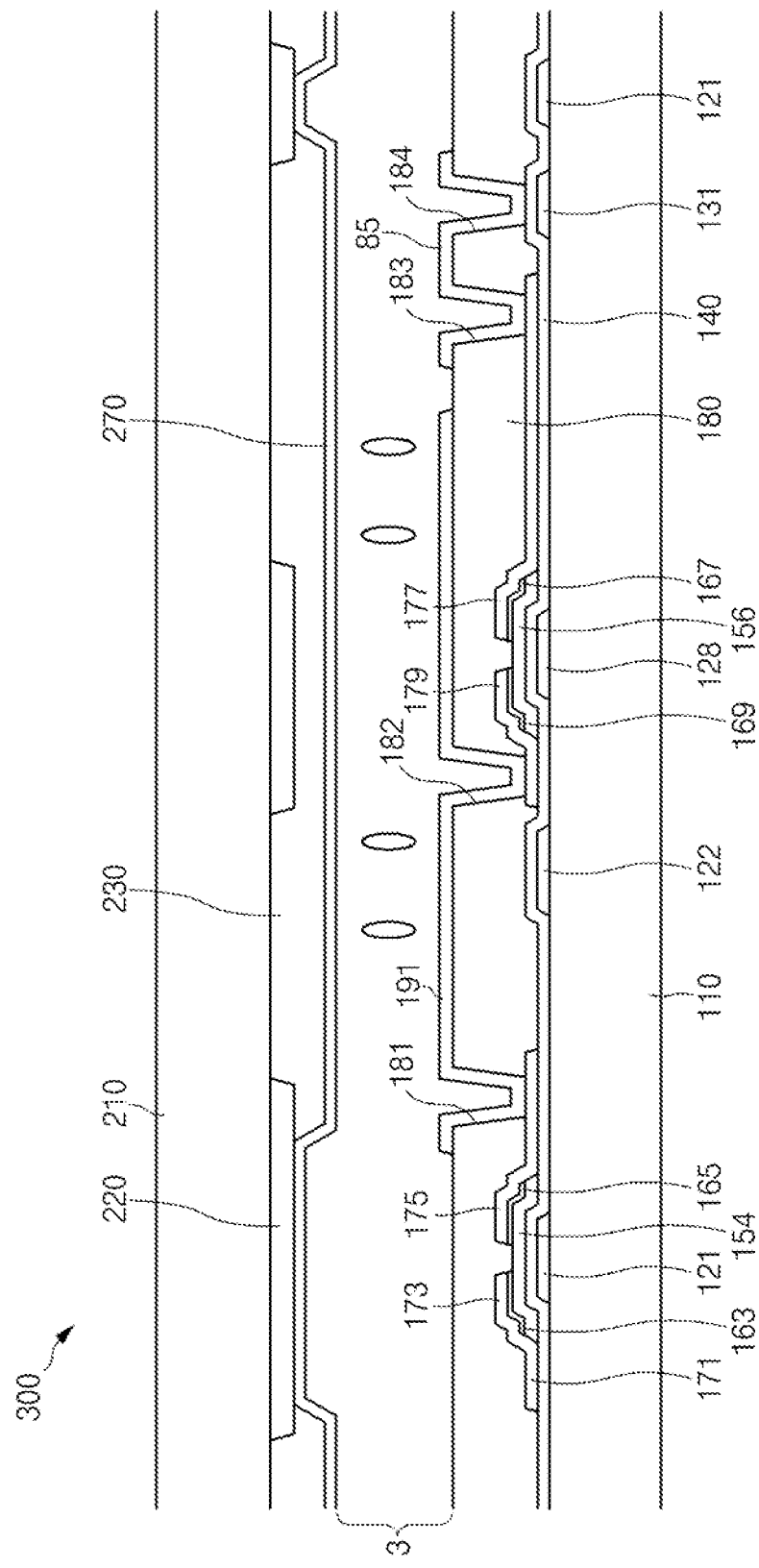
FIG. 4 is a cross-sectional view of the liquid crystal display shown in FIG. 3 taken along line IV-IV.

Referring to FIG. 4, two polarizers (not shown) are attached to the outer surfaces of the display panels 100 and 200, and the polarizing axis of one of the polarizers may be at right angles to the polarizing axis of the other.

One of the two polarizers may be omitted in a reflective liquid crystal display.

When a liquid crystal layer is vertically aligned, like in FIG. 4, the polarizers are disposed so as to be at right angles to each other, and an electric field is not applied to the liquid crystal layer 3, the incident light is blocked.

Meanwhile, when the polarizers are disposed so as to be at right angles to each other in a Twisted Nematic (TN) mode in which the liquid crystal is aligned to be twisted to the display panels 100 and 200, and the electric field is not applied to the liquid crystal layer 3, the incident light passes through the liquid crystal layer 3.

The signal controller 600 processes the input image signals R, G, and B so as to be suitable for the operational conditions of the liquid crystal panel assembly 300 and the data driver 500 in response to the input control signal, and generates, for example, a gate control signal CONT1 and a data control signal CONT2. Then, the signal controller 600 transmits the gate control signal CONT1 to the gate driver 400 and transmits the data control signal CONT2 and the processed image signal DAT to the data driver 500.

The output image signal DAT includes normal image data generated in response to the input image signals R, G, and B.

The gate control signal CONT1 includes a scanning start signal STV, a gate clock signal, and at least one output enable signal OE.

The data control signal CONT2 includes a horizontal synchronization start signal STH to inform a transmission start of the image data relative to the pixels, a load signal load to apply the data signals to the liquid crystal panel assembly 300, a data clock signal HCLK, and an inversion signal RVS.

The data driver 500 receives the output image signal DAT for the pixels and the data control signal CONT2 from the signal controller 600, and converts the digital image signal DAT into an analog data voltage Vd by selecting a gray voltage in response to each output image signal DAT. Then, the data driver 500 applies the analog data voltage Vd to the corresponding data lines.

The gate driver 400 applies the gate-on voltage Von to gate lines $GL_1$ to $GL_m$ in response to the gate control signal CONT1 from the signal controller 600, thereby turning on the switching elements connected to the gate lines $GL_1$ to $GL_m$.

Then, the data signals applied to the data lines D1 to Dm are supplied to the corresponding pixels PX through the switching elements Q, which are turned on.

The gate driver 400 applies erasing signals to erasing signal lines $CL_1$ to $CL_m$, thereby turning on erasing switching elements connected to the erasing signal lines $CL_1$ to $CL_m$.

If the erasing switching elements are turned on, the charges charged in the pixels are discharged. Therefore, a pixel potential changes into a storage electrode potential.

FIG. 2 is an equivalent circuit diagram showing a unit pixel of the liquid crystal display according to an exemplary embodiment of the present invention.

A unit pixel includes first and second switching elements Qp and Qc, a liquid crystal capacitor Clc, a storage capacitor Cst, a data line DL to transmit the image signal, a gate line GL to transmit a writing signal, an erasing line CL to transmit an erasing signal, and a storage electrode line SL to form the storage capacitor Cst.

Here, instead of forming the storage electrode line SL apart from the gate line GL, the gate line GL of the previous stage may be used as the storage electrode line.

The first switching element Qp includes a source electrode, a gate electrode, and a drain electrode. The source electrode is connected to the data line DL to transmit the image signal, the gate electrode is connected to the gate line GL to transmit the writing signal, and the drain electrode is connected to one end of the liquid crystal capacitor Clc and one end of the storage capacitor Cst.

When the writing signal is applied to the first switching element Qp, the first switching element Qp is turned on, and charges the image signal voltage transmitted through the source electrode to the liquid crystal capacitor Clc and the storage capacitor Cst.

One end of the liquid crystal capacitor Clc is connected to the drain electrode of the first switching element Qp, and the other end thereof is connected to a common electrode voltage VCOM.

When the liquid crystal capacitor Clc is charged, a potential difference corresponding to the image signal voltage is formed between the pixel electrode and the common electrode.

One end of the storage capacitor Cst is connected to the drain electrode of the first switching element Qp and one end of the liquid crystal capacitor Clc, and the other end thereof is connected to the storage electrode line SL through which the storage electrode voltage Vst is applied.

The storage electrode voltage Vst may be equal to the common electrode voltage Vcom.

The storage capacitor Cst is charged by the image signal voltage transmitted through the first switching element Qp, and holds the voltage charged into the liquid crystal capacitor Clc for one frame.

The second switching element Qc includes a source electrode, a gate electrode, and a drain electrode. The source electrode is connected to the storage electrode the SL, the gate electrode is connected to the erasing line CL, and the drain electrode is connected to one end of each of the liquid crystal capacitor Clc and the storage capacitor Cst that are connected to the drain electrode of the first switching element Qp.

As the erasing signal PLCR is applied through the erasing line CL, the second switching element Qc is turned on and discharges the image signal voltage charged into the liquid crystal capacitor Clc and the storage capacitor Cst to a level of the storage voltage Vst.

For example, the storage voltage Vst may be equal to the common voltage Vcom or may be higher than the common voltage Vcom by a predetermined voltage.

When the liquid crystal display is a normally black mode, the pixels display black by the common voltage Vcom or a voltage corresponding thereto.

When the liquid crystal display is a normally white mode, the pixels display black by a voltage in response to a black gray.

Furthermore, the source electrode of the second switching element Qc is connected to a wiring line that is formed separately from a storage capacitor Cst. Accordingly, a constant voltage is applied to the second switching element Qc through the wiring line.

As described above, the constant voltage to be applied is equal to the common voltage Vcom or may be higher than the common voltage Vcom by a predetermined voltage.

Figure 3:
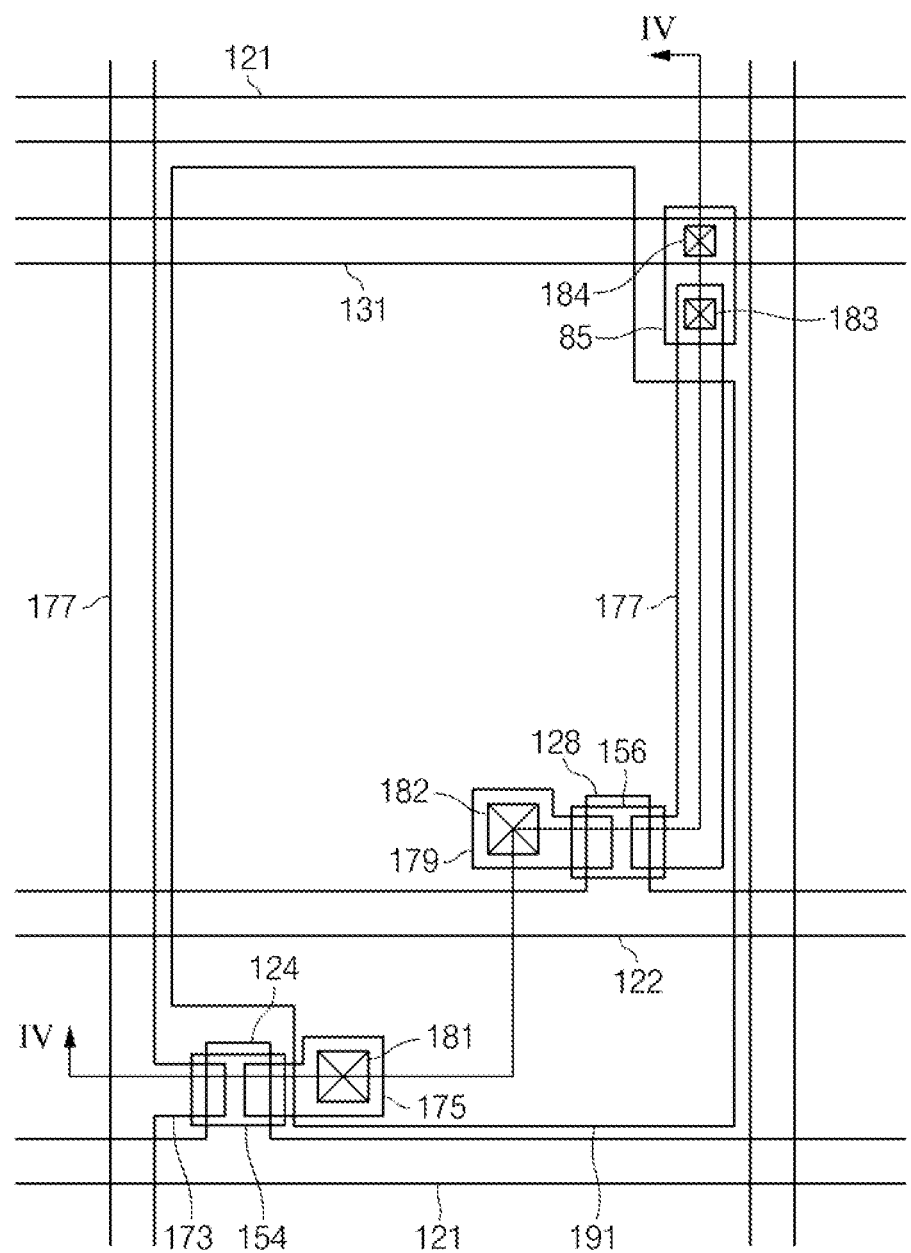
FIG. 3 is a layout view of a liquid crystal display according to an exemplary embodiment of the present invention.

FIG. 3 is a layout view of the liquid crystal display according to an exemplary embodiment of the present invention, and FIG. 4 is a cross-sectional view taken along the line IV-IV of FIG. 3.

The liquid crystal display according to an exemplary embodiment includes a lower panel 100, an upper panel 200 facing the lower panel, and a liquid crystal layer 3 interposed between the two panels 100, 200.

Referring to FIG. 3, a plurality of gate lines 121, storage electrode lines 131, and erasing signal lines 122 are formed on a substrate 110 that may include, for example, transparent glass.

The gate lines 121 transmit gate signals and mainly extend in a horizontal direction.

Each of the gate lines 121 includes a gate electrode 124 projecting upward and an end portion having a large area to contact with another layer or an external driving circuit.

A gate driving circuit (not shown) to generate the gate signals may be mounted on a flexible printed circuit film (not shown), which may be attached to the substrate 110, directly mounted on the substrate 110, or integrated into the 110.

When the gate driving circuit is integrated into the substrate 110, the gate lines 121 may be extended to be connected thereto.

The storage electrode lines 131 receive a predetermined voltage and extend substantially parallel to the gate lines 121.

The erasing signal lines 122 transmit the erasing signals and substantially extend in the horizontal direction.

Each of the erasing signal lines 122 includes a plurality of erasing gate electrodes 128 projecting upward.

The lateral sides of the gate lines 121, the storage electrode lines 131, and the erasing single lines 122 are inclined with respect to a surface of the substrate 110, and the inclination angles thereof may be in a range of about 30° to about 80°.

A gate insulating layer 140 is formed on the gate lines 121, the storage electrode lines 131, and the erasing signal lines 122. The gate insulating layer 140 may be include, for example, silicon nitride (SiNx), silicon oxide (SiOx).

A plurality of semiconductor layers 154 and 156 are formed on the gate insulating layer 140. The plurality of semiconductor layers 154 and 156 may include, for example, hydrogenated amorphous silicon (amorphous silicon is referred to as "a-Si"), polysilicon.

The semiconductor layers 154 are disposed on the gate electrodes 124, and the semiconductor layers 156 are disposed on the erasing gate electrodes 128.

A plurality of island-shaped ohmic contact layers 163 and 165 are formed on the semiconductor layers 154, and a plurality of island-shaped ohmic contact layers 167 and 169 are formed on the semiconductor layers 156.

The ohmic contact layers 163, 165, 167, and 169 may include, for example, n+ hydrogenated a-Si heavily doped with an n-type impurity, such as phosphorous or silicide.

The ohmic contact layers 163 and 165 are located by pairs of the semiconductor layers 154, and the ohmic contact layers 167 and 169 are located by pairs on the semiconductor layer 156.

The lateral sides of the semiconductor layers 154 and 156 and the ohmic contact layers 163, 165, 167, and 169 are inclined with respect to the surface of the substrate 110, and the inclination angles thereof may be in a range of about 30° to about 80°.

A plurality of data lines 171, a plurality of drain electrodes 175, a plurality of erasing source electrodes 177, and a plurality of erasing data electrodes 179 are formed on the ohmic contact layer 163, 165, 167, and 169 and the gate insulating layer 140.

The data lines 171 transmit data signals and extend substantially in the vertical direction to intersect the gate lines 121.

Each of the data lines 171 includes a plurality of source electrodes 173 projecting toward the gate electrodes 124 and an end portion having a large area to contact with another layer or an external driving circuit.

A data driving circuit (not shown) to generate the data signals may be mounted on a flexible printed circuit film (not shown), which may be attached to the substrate 110, directly mounted on the substrate 110, or integrated into the substrate 110.

When the data driving circuit is integrated into the substrate 110, the data lines 171 may be extended to be connected thereto.

The drain electrodes 175 are separated from the data lines 171 and face the source electrodes 173 with respect to the gate electrodes 124.

Each of the drain electrodes 175 includes one wide end and one rod-shaped end, and the rod-shaped end faces the source electrodes 173.

One end of the erasing source electrodes 177 faces one end of the erasing drain electrodes 179 with respect to the erasing gate electrodes 128.

Each of the erasing source electrodes 177 extends parallel to the data lines 171 to the vicinity of the storage electrode line 131.

Each of the erasing drain electrodes 179 includes one wide end and one rod-shaped end, and the rod-shaped end faces the erasing source electrodes 177.

A thin film transistor (TFT) may include a gate electrode 124, a source electrode 173, and a drain electrode 175 together with a semiconductor layer 154. A channel of the TFT is formed in the semiconductor layer 154 disposed between the source electrode 173 and the drain electrode 175.

In addition, an erasing TFT may include an erasing gate electrode 128, an erasing source electrode 177, and an erasing drain electrode 179 together with a semiconductor layer 156.

The lateral sides of the data lines 171, the drain electrodes 175, the erasing source electrodes 177, and the erasing drain electrodes 179 may be inclined with respect to the surface of the substrate 110 in a range of about 30° to about 80°.

The ohmic contact layers 163, 165, 167, and 169 are formed between the underlying semiconductor layers 154 and 156 and the overlying data lines 171, drain electrodes 175, erasing source electrodes 177, and erasing drain electrodes 179, and reduce the contact resistance therebetween.

A passivation layer 180 is formed on the data lines 171, the drain electrodes 175, the erasing source electrodes 177, and the erasing drain electrodes 179.

The passivation layer 180 may include an inorganic insulator, such as silicon nitride and silicon oxide, an organic insulator, or a low dielectric constant insulator.

The dielectric constants of the organic or inorganic insulators may be less than about 4.0, respectively, and the low dielectric constant insulator may be, for example, a-Si:C:O, a-Si:O:F, or the like formed through a plasma enhanced chemical vapor deposition (PECVD) process.

The passivation layer 180 may include, for example, an organic insulator having photosensitivity, and the surface of the passivation layer 180 may be flattened.

However, the passivation layer 180 may be a double-layered structure including a lower inorganic layer and an upper organic layer such that the exposed portions of the semiconductor layers 154 are prevented from being damaged while having the excellent insulating characteristics of the organic layer.

A plurality of contact holes 181, 182, and 183 are formed in the passivation layer 180. The particularly of contact holes 181, 182, and 183 expose the drain electrodes 175, the erasing drain electrodes 179, and the erasing source electrodes 177, respectively. In addition, a plurality of contact holes 184 are formed between the passivation layer 180 and the gate insulating layer 140. The plurality of contact holes 184 expose the storage electrode lines 131.

A plurality of pixel electrodes 191 and a plurality of overpasses 85 are formed on the passivation layer 180.

The plurality of pixel electrodes 191 and the plurality of overpasses 85 may include, for example, a transparent conductive material, such as ITO or IZO, or reflective conductor, such as Ag, Al, or alloys thereof.

The pixel electrodes 191 are physically and electrically connected to the drain electrodes 175 through the contact holes 181 to receive the data voltages from the drain electrodes 175.

The pixel electrodes 191 to which the data voltages are applied generate electric fields in cooperation with a common electrode 270 or the other display panel 200, thereby adjusting the orientation of liquid crystal molecules of the liquid crystal layer 3.

The pixel electrodes 191 and the common electrode 270 from a liquid crystal capacitor, which stores the applied voltages after the TFT is turned off.

The pixel electrodes 191 are physically and electrically connected to the erasing drain electrodes 179 through the contact holes 182 to receive the voltage of the storage electrode lines 131 from the erasing drain electrodes 179.

When the voltages of the storage electrode lines 131 are applied to the pixel electrode 191, the data voltages charged in the pixel electrodes 191 are erased and the black voltage is applied.

The pixel electrodes 191 overlap the storage electrode lines 131.

The capacitors referred to as "storage capacitors" are formed by overlapping the pixel electrodes 191 and the drain electrodes 175 connected thereto with the storage electrode lines 131, and enhance the voltage storing capacity of the liquid crystal capacitors.

The overpasses 85 connect the erasing source electrodes 177 with the storage electrode lines through the contact holes 183 and 184.

Referring to FIG. 4, a light blocking member 220 is formed on an insulating substrate 210 including, for example, a transparent glass, in a predetermined pattern, and color filters 230 are formed on the light blocking member 220.

The common electrode 270 including, for example, a transparent conductive material, such as ITO or IZO is formed on the color filters 230 and the light blocking member 220.

The liquid crystal layer 3 interposed between the lower panel 100 and the upper panel 200 may be vertically oriented with respect to the display panels 100 and 200.

According to an exemplary embodiment of the present invention, the writing signal applied to the gate line may also be used as an erasing signal applied to an erasing signal line corresponding to the gate line.

For example, when the liquid crystal display includes m gate lines, the writing signal applied to the (k−n)-th (k>1) gate line may also be used as an erasing signal applied to the k-th erasing signal line.

Figure 6:
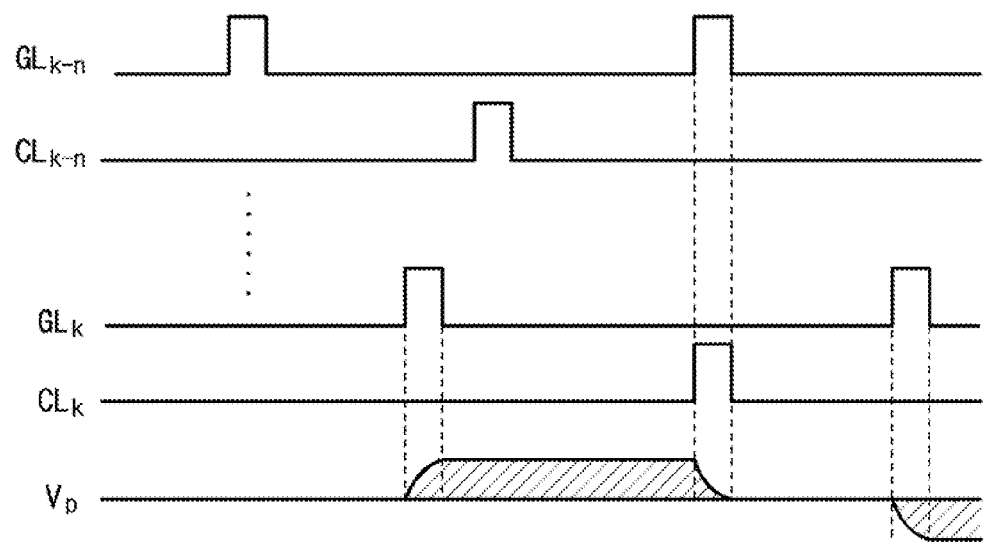
FIG. 6 is a timing diagram showing gate signals, erasing signals, and a voltage of a pixel for a liquid crystal display according to an exemplary embodiment of the present invention.

FIG. 6 is a timing diagram showing writing signals and erasing signals applied to the liquid crystal display according to an exemplary embodiment of the present invention, and a charging state of pixels according to the writing signals and erasing signals over time.

When a first frame starts and a gate-on signal (writing signal) is applied to a k-th gate line, all of the pixels connected to the k-th gate line are charged by the data voltages that are supplied through the data lines, and when the gate-on signal ends, the electric charges charged in the pixels are stored by the liquid crystal capacitors and the storage capacitors.

When the next frame starts and the gate-on signal (writing signal) is applied to a (k−n)-th gate line, the gate-on signal (erasing signal) is applied to a k-th erasing signal line at the same time. Therefore, the electric charges, which are charged in all of the pixels connected to the k-th erasing signal line, are discharged, and the potentials of the pixel electrodes vary to the same level as Vst.

Accordingly, in the liquid crystal display of a normally black mode, since all of the pixels connected to the k-th erasing signal line are non-transmittance states when the gate-on signal is applied to the (k−n)-th gate line, all the pixels display black.

The black displaying period of the liquid crystal display according to an exemplary embodiment of the present invention varies in accordance with the ratio of m and n.

Indicating one frame period as T, since the period for which one gate line is turned on is T/m, the period from a time point at which the k-th gate line of the first frame is turned on to a time point at which the (k−n)-th gate line of the next frame is turned on is calculated as (m−n)T/m.

Accordingly, each pixel stores the charged voltage during the period of (m−n)T/m and displays black during nT/m, which is the remaining period of one frame.

Therefore, in order to extend the black display period, it is required to increase the m value, and in order to reduce the black display period, it is required to decrease the n value.

In an exemplary embodiment of the present invention, the erasing signal lines having a k value smaller than the n value use the gate signal applied to a (m−k+n)-th gate line as an erasing signal in order to display black during the nT/m period.

Accordingly, in an exemplary embodiment of the present invention, the erasing signal applied to the k-th erasing signal line is identical to the gate signal applied to the (k−n)-th (k>n) gate line or the gate signal applied to the (k−n+m)-th (k≤n) gate line.

The gate signal applied to one gate line may be used as the erasing signal applied to the corresponding erasing signal line by connecting the gate line to the erasing signal line corresponding to the gate line through a separate wiring line.

Figure 5:
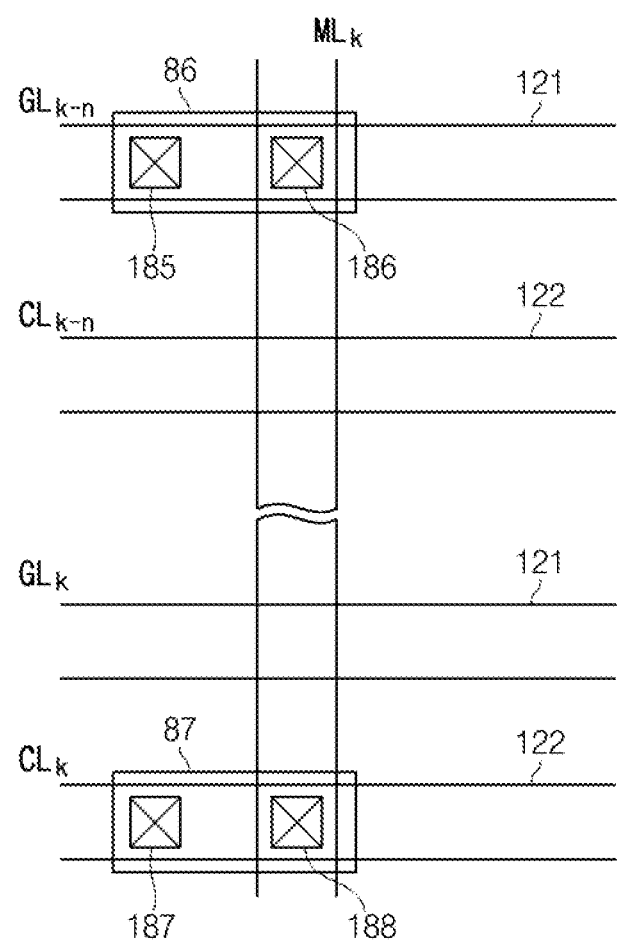
FIG. 5 is a layout view showing a connection structure of gate lines and erasing signal lines according to an exemplary embodiment of the present invention.

FIG. 5 is a view showing the layout of a connection structure of a gate line GLk-n and an erasing signal line CLk corresponding to each other.

A connection line MLk comes into contact with a connection pad 86 including, for example, the same material, such as ITO or IZO, as the pixel electrode through a contact hole 186, and the (k−n)-th gate line GLk-n also comes into contact with the connection pad 86 through the contact hole 185.

Accordingly, the connection line MLk is connected to the (k−n)-th gate line GLk-n through the connection pad 86.

In addition, the connection line MLk comes into contact with a connection pad 87 including, for example, the same material, such as ITO or IZO, as the pixel electrode through a contact hole 188, and the k-th erasing signal line CLk also comes into contact with the connection pad 87 through the contact hole 187.

Accordingly, the connection line MLk is connected to the k-th erasing signal line CLk through the connection pad 87.

The connection line MLk is connected to the k-th erasing signal line and the (k−n)-th (in a case of k>n, n is a natural number that is smaller than m) gate line or (k−n+m)-th (in case of k≤n) gate line so as to electrically connect the k-th erasing signal line to the (k−n)-th or (k−n+m)-th gate line, which makes it possible to simultaneously apply the same gate-on signal to the two lines.

The gate-on signal may be used as a writing signal of a predetermined pixel row and an erasing signal of a pixel row corresponding to the predetermined pixel row at the same time by corresponding the gate lines and the erasing signal lines one-to-one.

Alternatively, by connecting the erasing signal line to the gate driver (400 of FIG. 1) through a separate wiring line, the erasing signal line can be supplied with an independent erasing signal other than the gate-on signal.

As described above, exemplary embodiments of the present invention can increase a response speed of the liquid crystal display and can suppress a ghost and a blur of the image by discharging the charges, which are charged in the liquid crystal capacitor, at a predetermined voltage and inserting the black pixel data in each frame period. Therefore, the present invention is suitable for displaying a moving picture.

As described above, it can suppress a ghost phenomenon and a blurring phenomenon by inserting the black pixel data in each frame period and blocking light emitted from each pixel to remove an after image suffused on the retina of the eye.

Although the illustrative embodiments of the present invention have been described herein with reference to the accompanying drawings, it is to be understood that the present invention should not be limited to those precise embodiments, and that various other change and modifications may be affected therein by one of ordinary skill in the related art without departing from the scope or spirit of the invention. All such changes and modifications are intended to be included within the scope of the invention as defined by the appended claims.

What is claimed is:

1. A method of driving a display device having a plurality of pixel rows, the method comprising:
    applying a writing signal to one of a plurality of gate lines to charge capacitors of a first pixel row associated with one of the plurality of gate lines;
    applying an erasing signal to one of a plurality of erasing signal lines to discharge capacitors of a second pixel row associated with the one of the plurality of erasing signal lines,
    wherein the writing signal and the erasing signal have the same waveform so that the writing signal and the erasing signal are both simultaneously activated to a duration of a high level pulse at a first time point and after the duration of the high level pulse has ended, the writing signal and the erasing signal are both simultaneously deactivated to a low level at a second time point, the second time point being greater than the first time point, and
    wherein the first pixel row is different from the second pixel row.

2. The method of driving a display device of claim 1, wherein one of the plurality of gate lines of the first pixel row is electrically coupled to one of the plurality of erasing signal lines of the second pixel row, wherein the writing signal is substantially the same as the erasing signal.

3. A liquid crystal display comprising:
a plurality of gate lines;
a plurality of erasing signal lines;
a plurality of pixel rows, wherein each pixel row comprises a plurality of pixels configured to share one of the plurality of gate lines and one of the plurality of erasing signal lines;
a gate driver configured to supply a writing signal and an erasing signal to a gate line of a first pixel row and an erasing signal line of a second pixel row, respectively,
wherein the writing signal and the erasing signal have the same waveform so that the writing signal and the erasing signal are both simultaneously activated to a duration of a high level pulse at a first time point and after the duration of the high level pulse has ended, the writing signal and the erasing signal are both simultaneously deactivated to a low level at a second time point, the second time point being greater than the first time point, and
wherein the first pixel row is different from the second pixel row.

4. The liquid crystal display of claim 3, further comprising:
a connection line configured to connect the gate line of the first pixel row and the erasing signal line of the second pixel row.

5. The liquid crystal display of claim 4, further comprising:
a first connection pad configured to connect the erasing signal line of the second pixel row and the connection line; and
a second connection pad configured to connect the gate line of the first pixel row and the connection line.

6. The liquid crystal display of claim 5, wherein the connection line, the first connection pad, and the second connection pad are formed in a peripheral area.

7. The liquid crystal display of claim 3, wherein each pixel comprises:
a first thin film transistor including a first source electrode connected to one of a plurality of data lines, a first gate electrode connected to one of the plurality of gate lines, and a first drain electrode connected to a pixel electrode; and
a second thin film transistor including a second drain electrode connected to the pixel electrode, a second gate electrode connected to one of the plurality of erasing signal lines, and a second source electrode connected to a predetermined voltage.

8. The liquid crystal display of claim 7, further comprising:
a plurality of storage electrode lines, wherein one of the plurality of storage electrode lines is electrically coupled to the second source electrode to supply the predetermined voltage.

* * * * *